(12) United States Patent
Nation

(10) Patent No.: US 7,149,484 B2
(45) Date of Patent: Dec. 12, 2006

(54) PORTABLE COMMUNICATION DEVICE HAVING ADJUSTABLE AMPLIFICATION AND METHOD THEREFOR

(75) Inventor: Med A. Nation, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 359 days.

(21) Appl. No.: 10/264,842

(22) Filed: Oct. 3, 2002

(65) Prior Publication Data

US 2004/0198465 A1   Oct. 7, 2004

(51) Int. Cl.
*H04B 1/04* (2006.01)

(52) U.S. Cl. ............... 455/126; 455/127.2; 455/67.13; 455/63.1; 330/149; 330/151; 375/297; 375/296

(58) Field of Classification Search .............. 455/125, 455/63, 501, 75, 127.2, 67.13, 108, 126, 455/63.1; 330/149, 151, 127; 375/346, 375/296, 297; 332/159, 162
See application file for complete search history.

(56) References Cited

U.S. PATENT DOCUMENTS

| | | | |
|---|---|---|---|
| 4,291,277 A | 9/1981 | Davis et al. | |
| 4,700,151 A | 10/1987 | Nagata | |
| 5,113,414 A | 5/1992 | Karam et al. | |
| 5,523,716 A | 6/1996 | Grebliunas et al. | |
| 5,524,285 A | 6/1996 | Wray et al. | |
| 5,589,797 A | 12/1996 | Gans et al. | |
| 5,598,127 A | 1/1997 | Abbiati et al. | |
| 5,598,436 A | 1/1997 | Brajal et al. | |
| 5,699,383 A | 12/1997 | Ichiyoshi | |
| 5,742,201 A | 4/1998 | Eisenberg et al. | |
| 5,892,397 A | 4/1999 | Belcher et al. | |
| 6,072,364 A | 6/2000 | Jeckeln et al. | |
| 6,166,598 A * | 12/2000 | Schlueter | 330/127 |
| 6,275,685 B1 * | 8/2001 | Wessel et al. | 455/126 |
| 6,542,722 B1 * | 4/2003 | Sorrells et al. | 455/110 |
| 6,614,854 B1 * | 9/2003 | Chow et al. | 375/297 |
| 6,703,897 B1 * | 3/2004 | O'Flaherty et al. | 330/149 |
| 6,788,744 B1 * | 9/2004 | Hirama | 375/297 |
| 6,801,784 B1 * | 10/2004 | Rozenblit et al. | 455/522 |
| 2003/0032397 A1 * | 2/2003 | Kuechler et al. | 455/127 |
| 2003/0069049 A1 * | 4/2003 | Poranen et al. | 455/572 |
| 2003/0109222 A1 * | 6/2003 | Sun et al. | 455/24 |
| 2003/0162518 A1 * | 8/2003 | Baldwin et al. | 455/253.2 |
| 2004/0102207 A1 * | 5/2004 | Wenzel et al. | 455/522 |
| 2004/0203337 A1 * | 10/2004 | Ammar | 455/3.02 |

* cited by examiner

*Primary Examiner*—Danh Cong Le
(74) *Attorney, Agent, or Firm*—Scott M. Lane

(57) ABSTRACT

Briefly, in accordance with one embodiment of the invention, a portable communication device comprises an amplifier having an input signal and an output signal. The amplitude of the input signal may be compared to the amplitude of the output signal and an appropriate analog signal may be generated to adjust the ratio of the input signal to the output signal.

15 Claims, 4 Drawing Sheets

PORTABLE COMMUNICATION DEVICE HAVING ADJUSTABLE AMPLIFICATION AND METHOD THEREFOR

BACKGROUND

Portable communication devices such as, for example, cellular phones, wireless personal digital assistants, etc. may include an amplifier connected to an antenna. The amplifier may amplify an input signal and generate an output signal that is then transmitted by the antenna. The efficiency of the amplifier is generally measured by comparing the amount of power consumed by the amplifier vs. the amount of power of the signal that is transmitted by the antenna.

To improve the efficiency of the transmitting amplifier, a predistortion loop may be used to adjust the input signal to the amplifier to achieve a desired output signal that is as linear as possible. However, conventional predistortion loops involve the use of processing of the input signal in the digital domain. Such processing may involve additional processors and/or other logic circuitry that may increase the cost and complexity of the portable communication device.

Thus, there is a continuing need for better ways to improve the efficiency or linearity of amplifiers in portable communication devices.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
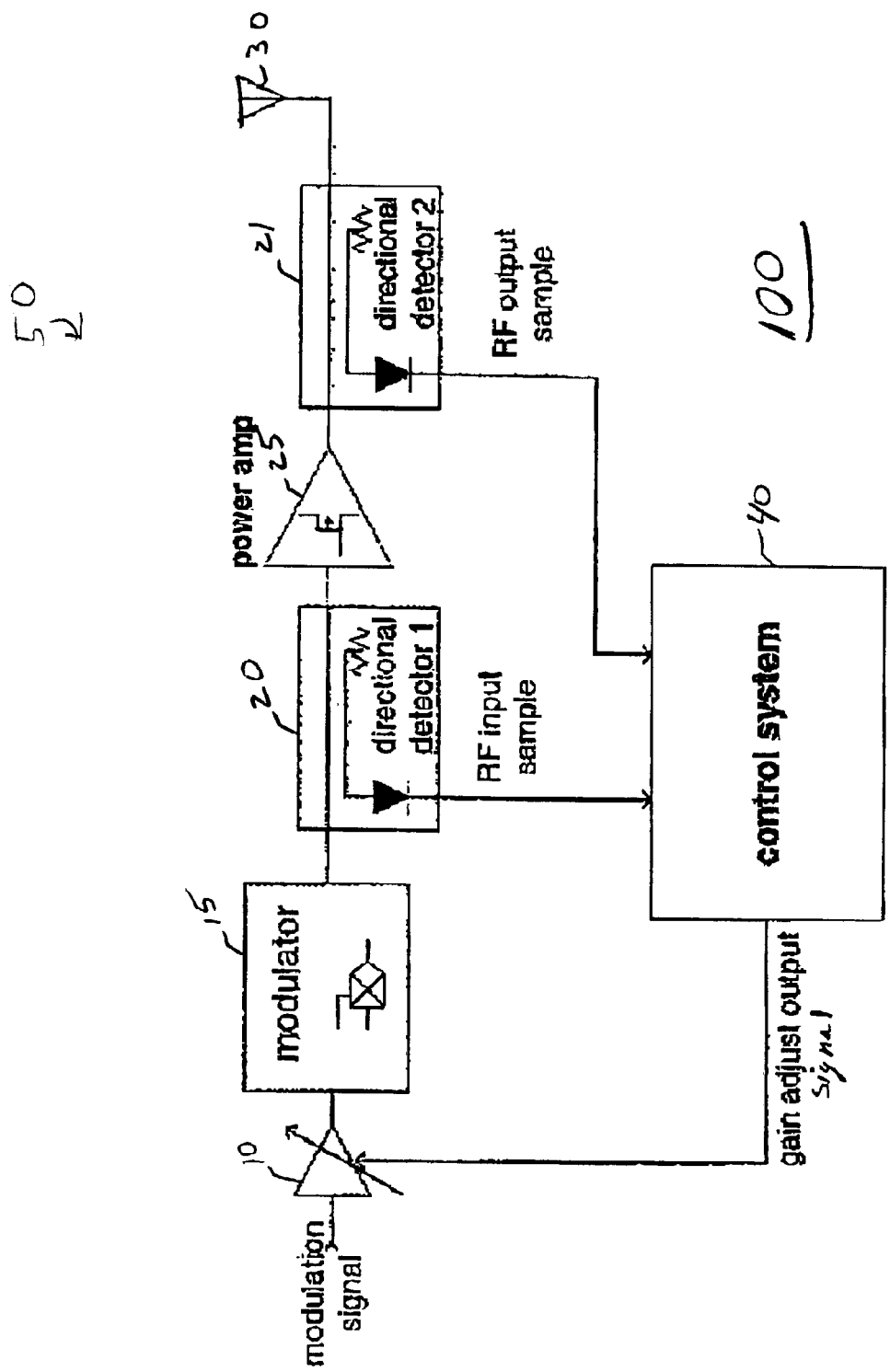
FIGS. 1–4 are schematic representations of a portion of a portable communication device in accordance with various embodiments of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computing device selectively activated or reconfigured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Turning to FIG. 1, an embodiment 100 in accordance with the present invention is described. Embodiment 100 may comprise a portable communication device 50 such as a mobile communication device (e.g., cell phone), a two-way radio communication system, a one-way pager, a two-way pager, a personal communication system (PCS), a portable computer, or the like. Although it should be understood that the scope and application of the present invention is in no way limited to these examples and that only a portion of portable communication device 50 is shown in FIG. 1.

It should be understood that embodiments of the present invention may be used in a variety of applications. Although the present invention is not limited in this respect, the circuits disclosed herein may be used in many apparatuses such as in the transmitters and receivers of a radio system. Radio systems intended to be included within the scope of the present invention include, by way of example only, cellular radiotelephone communication systems, satellite communication systems, two-way radio communication systems, one-way pagers, two-way pagers, personal communication systems (PCS), personal digital assistants (PDA's) and the like.

Types of cellular radiotelephone communication systems intended to be within the scope of the present invention include, although not limited to, Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, third generation (3G) systems like Wide-band CDMA (WCDMA), CDMA-2000, and the like, although the scope of the present invention is not limited to these examples.

Embodiment 100 here includes an amplifier 10 that may receive as an input signal a signal to be modulated. Although the scope of the present invention is not limited in this respect, the input signal may be provided from a base band processor (not shown) and may represent a information signal that is to be transmitted by portable communication device 50 using, for example, one of the communication standards described above.

Amplifier 10 may amplify the input signal and provide the signal to a modulator that may modulate the signal in accordance with the communication protocol employed by portable communication device 50. It should be understood that the scope of the present invention is not limited by the particular modulation scheme used and that the use of amplifier 10 should be considered optional in other embodiments.

The modulated signal may then be provided to a detector 20 and to a power amplifier 25. In this embodiment detector 20 may be a directional detector that may comprise a directional coupler and a diode detector. The use of a directional coupler may be desirable to reduce the risk of reflected signal from affecting the sampled signal. Although the scope of the present invention is not limited in this respect, detector 20 may be an envelope detector that is capable of following the highest frequency components from modulator 15.

In alternative embodiments, detector 20 may be a root mean square (RMS) detector, a peak amplitude detector, or any detector that is able to provide an output signal that is proportionate to the amplitude of the analog signal to be provided to power amplifier 25. As explained in more detail below, detector 20 may provide an output signal that represents the amplitude or magnitude of the signal to be amplified by power amplifier 25.

Portable communication device 50 may also include another detector 21 that may be used to provide an output signal that represents the amplitude or magnitude of the signal generated by power amplifier 25 and provided to an antenna 30. Although the scope of the present invention is not limited in this respect, detector 21 may be the same as detector 20 or one of the alternatives described above.

The outputs of detectors 20–21 may be provided to a control system 40, which, in turn, may determine if the output of power amplifier 25 is appropriate given the amplitude of the input signal to power amplifier 25. As explained in more detail below, control system 40 may then generate an output signal to adjust the input signal so that the output of power amplifier 25 has desired characteristics.

For example, although the scope of the present invention is not limited in this respect, control system 40 may perform a scalar analog comparison of the input signal to power amplifier 25 with its output signal. Control system 40 may compare the amplitude of the input signal with the output signal of power amplifier to determine if the two signals are within an acceptable ratio of each other. For example, control system 40 may determine if the output signal of power amplifier 25 is at a substantially constant linear ratio with respect to its input signal.

Although the scope of the present invention is not limited in this respect, control system 40 may comprise a comparator and may continuously monitor the ratio of the two signals. This may allow control system 40 to adjust the ratio dynamically so that portable communication device transmits using power amplifier 25 at a desired efficiency. For example, control system 40 may be used to adjust the gain of power amplifier 25 so that the output signal is about 10–40 times greater than the input signal, although the scope of the present invention is not limited in this respect.

One advantage of this particular embodiment is that control system 40 may be able to perform an analog comparison of the amplitude of the input signal to power amplifier 25 to the amplitude of the output signal of power amplifier 25. This may be accomplished without the need for additional circuitry or logic to perform the comparison in the digital domain. Further, in this particular embodiment control system 40 may compare only the amplitude of the input signal to the amplitude of the output signal of power amplifier 25, although the scope of the present invention is not limited in this respect. Because this particular embodiment may obviate the need to perform a comparison of the phase of the two signals, control system 40 may be faster and involve less complexity than traditional predistortion loops. In alternative embodiments, control system 40 may perform other comparisons such as comparing currents, voltage potentials, peak voltage potentials, etc. of the input and output of power amplifier 25.

If control system 40 determines that the output of power amplifier 25 is not acceptable or desirable given the characteristics of the input signal, control system 40 may generate an output signal that ultimately results in a change in the output 10 signal of power amplifier 25. For example, in this particular embodiment control system 40 may generate an analog output signal that adjusts the operation of amplifier 10. Thus, control system 40 may increase the gain of amplifier 10, which, in turn, may increase the amplitude of the input signal to power amplifier 25, although the scope of the present invention is not limited in this respect. Further, it may be desirable if control system 40 has a response time that is at least 5–30% of the modulation symbol time of modulator 15, although the scope of the present invention is not limited in this respect.

Figure 2:
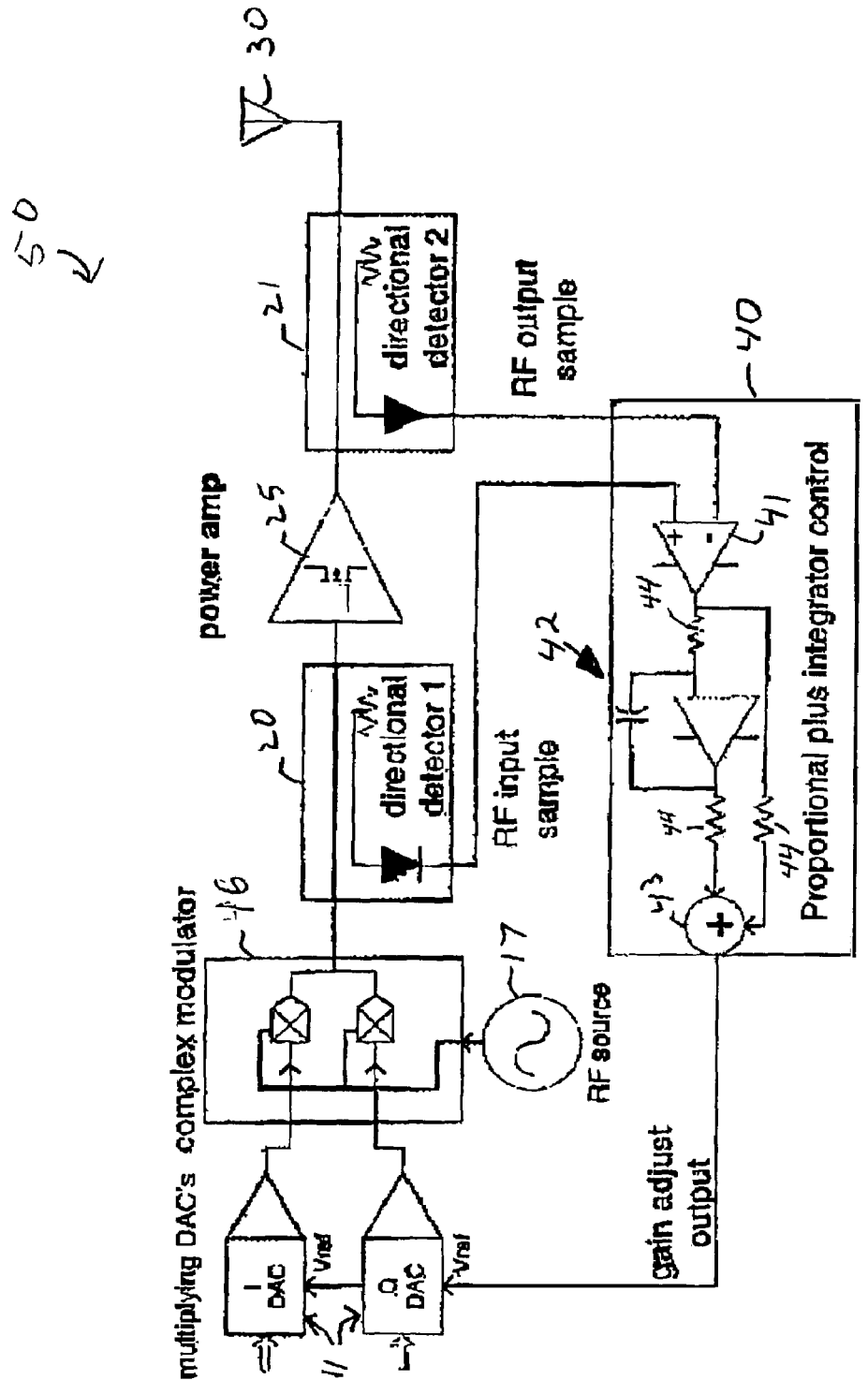

FIG. 2 illustrates an alternative embodiment 200 for portable communication device 50. In this particular embodiment portable communication device may include digital-to-analog converters (DAC) 11 that may generate signals to be modulated by modulator 16 using an RF source 17. If control system 40 detects that the ratio of the input vs. output of power amplifier 25 is not desirable, it may generate an analog output signal that may be used as a reference voltage potential for DACs 11. Thus, control system 40 may adjust the input signal into power amplifier 25 by adjusting the reference voltage to perform the digital-to-analog conversion.

FIG. 2 also illustrates how a portion of control system 40 may be implemented. For example, although the scope of the present invention is not limited in this respect, control system 40 may include a differential amplifier 41 whose output may be integrated by an integrator 42 and combined with an adder 43. Control system may also optionally include resistive elements 44 that may be used as a voltage and/or current divider.

Figure 3:
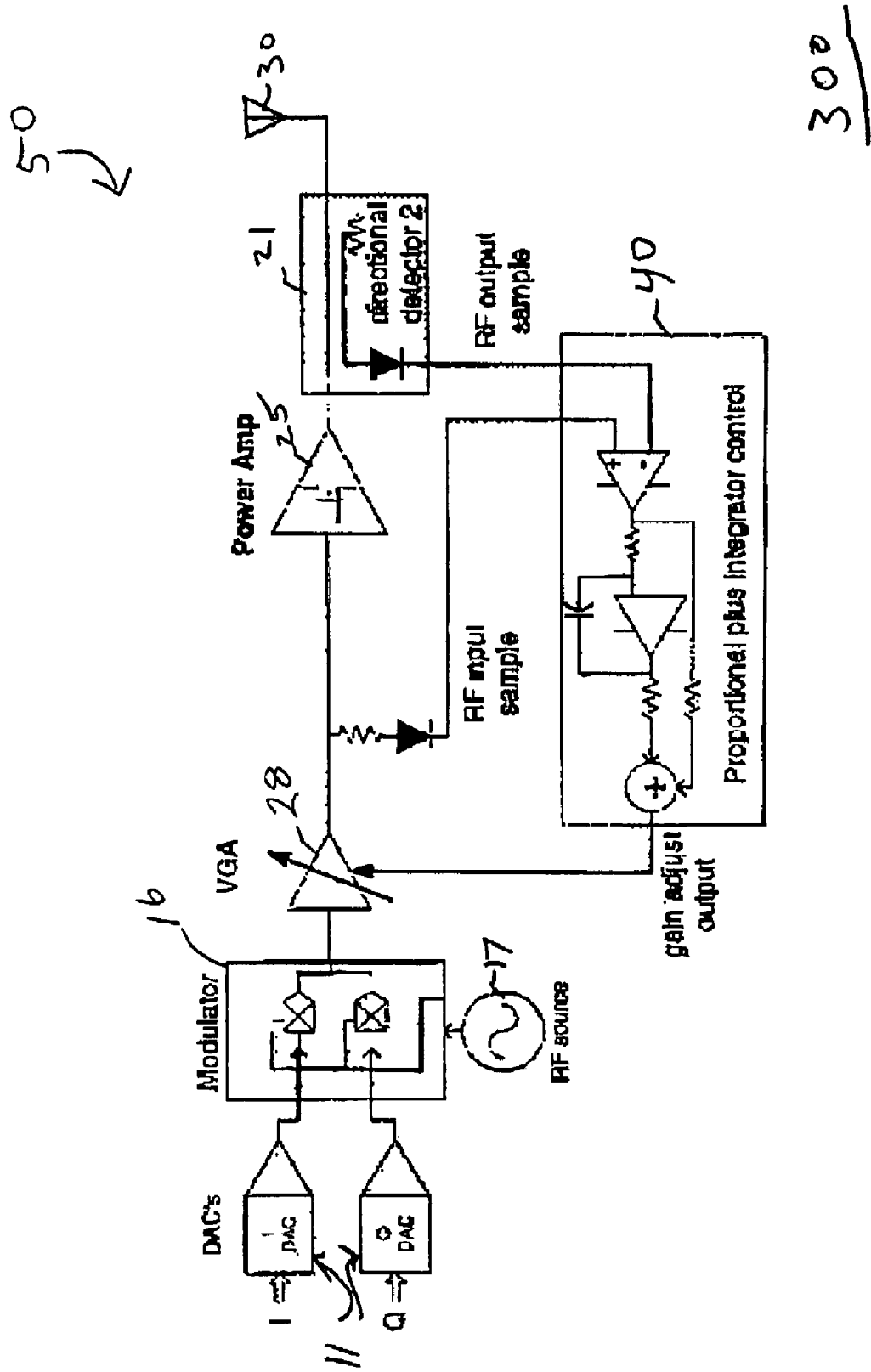

FIG. 3 illustrates an alternative embodiment 300 for portable communication device 50 that includes a variable gain amplifier (VGA) 28 that may be used to amplifier the output of modulator 16. In this particular embodiment, control system 40 may compare the output of VGA 28 to the output of power amplifier 25 (provided by detector 21). If control system 40 detects that the ratio of the input vs. output of power amplifier 25 is not desirable, it may generate an analog output signal that may be used to dynamically adjust the gain of VGA 28. Thus, control system 40 may adjust the input signal into power amplifier 25 by adjusting the gain of an intermediate stage amplifier.

Figure 4:
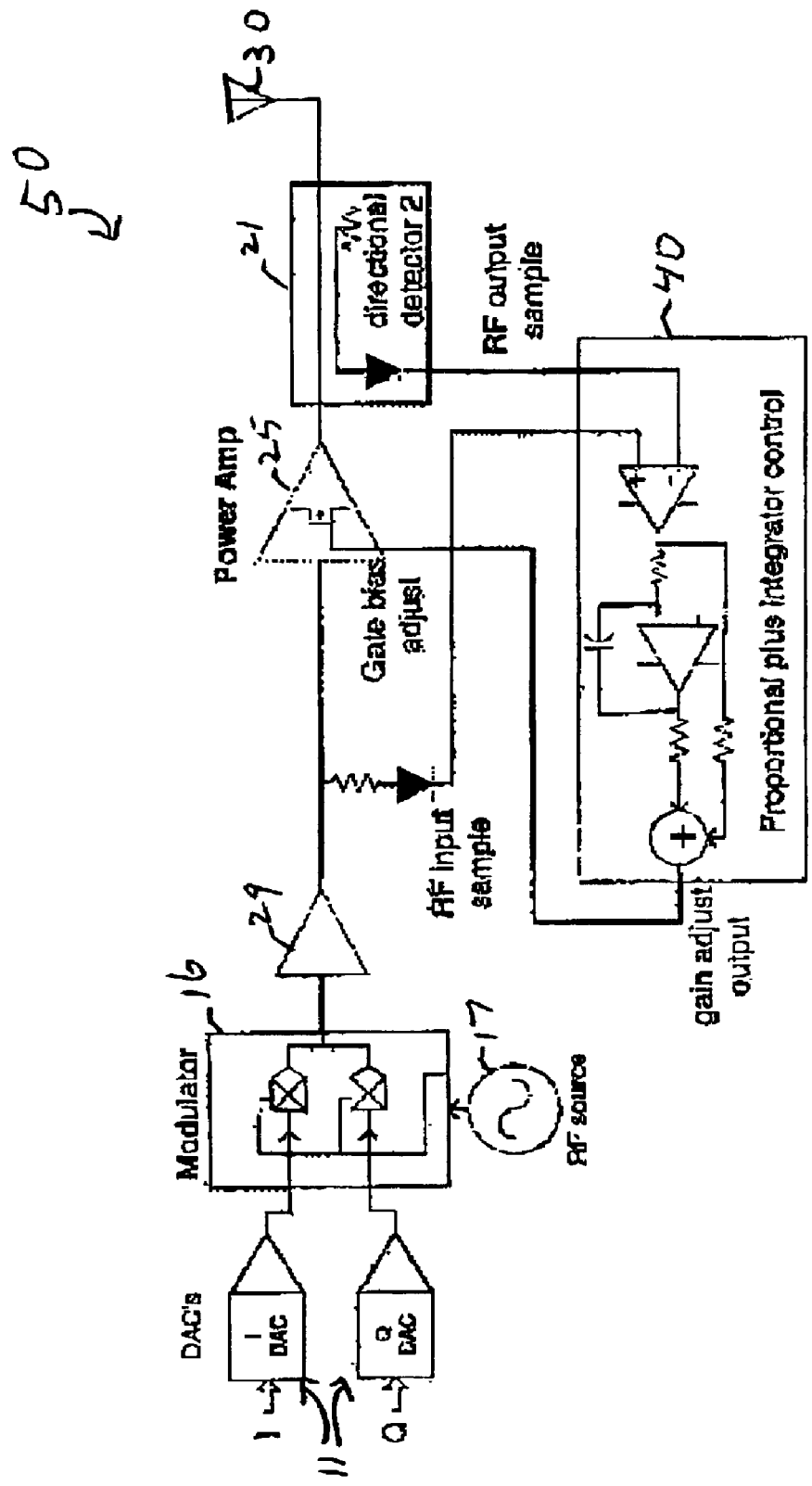

FIG. 4 illustrates an alternative embodiment 400 for portable communication device 50. Instead of using variable gain amplifier (VGA) 28 as shown in FIG. 3, a amplifier 29 may be used that has a gain that is substantially constant. Control system 40 may then compare the output of amplifier 29 (i.e. the input of power amplifier 25) to the output of power amplifier 25 (provided by detector 21). If control system 40 detects that the ratio of the input vs. output of power amplifier 25 is not desirable, it may generate an analog output signal that may be used to dynamically adjust the gain of power amplifier 25. Thus, control system 40 may be able to dynamically monitor and alter the gain of power amplifier 25 by comparing signals in the analog domain, although the scope of the present invention is not limited in this respect.

It should be understood that portable communication device 50 may include memory (not shown) that may be used to store messages transmitted to or by portable communication device 50. The memory may also optionally be used to store instructions that are executed by a processor during the operation of portable communication device 50, and may be used to store user data such as the conditions for when a message is to be transmitted by portable communication device 50. Such memory may be provided my one or more different types of memory. For example, volatile memory (any type of random access memory) or nonvolatile memory, such as flash memory, although the scope of the present invention is not limited in this respect. Portable communication device 50 may also comprise one or more transceivers (not shown) to allow portable communication device 50 to communicate using one or more of the protocols listed above.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A method of adjusting transmission power level of a portable communication device comprising:
   performing a scalar analog comparison of a modulated input signal to an amplifier with an output signal of the amplifier;
   generating an analog output signal without any digitized processing, the analog output signal based on the comparison; and
   adjusting only a magnitude but not phase of an input signal to the amplifier by predistorting then modulating the input signal, wherein adjusting is based on the analog output signal.

2. The method of claim 1, wherein generating the analog output signal includes generating an analog output signal so that the output signal from the amplifier is at a substantially constant linear ratio with respect to the modulated input signal of the amplifier.

3. The method of claim 2, wherein generating the analog output signal includes generating an analog output signal so that the output signal to the amplifier is about 10–40 times greater than the modulated input signal of the amplifier.

4. The method of claim 1, wherein the analog output signal is pre-distorted using a digital-to-analog converter.

5. The method of claim 4, wherein providing the analog output signal to the digital-to-analog converter includes providing the analog signal as a voltage reference input to the digital-to-analog converter.

6. The method of claim 1, further comprising providing the analog output signal to a intermediate amplifier so that the intermediate amplifier increases the gain of its output.

7. The method of claim 1, further comprising providing the analog output signal to the amplifier.

8. The method of claim 7, wherein the analog output signal causes the amplifier to increase the gain of its output.

9. The method of claim 1, further comprising comparing the amplitude of the modulated input signal to the amplifier to the output signal of the amplifier.

10. The method of claim 9, further comprising comparing only the amplitude of the modulated input signal to the amplifier to the output signal of the amplifier.

11. The method of claim 9, further comprising comparing a peak voltage potential of the modulated input signal to a peak voltage potential of the output signal.

12. A portable communication device comprising:
    an amplifier to receive a modulated input signal and provide an output signal; and
    a control circuit coupled to the amplifier to perform a scalar analog comparison of the amplitude of the modulated input signal to the output signal and output an analog control signal, wherein the portable communication device is adapted to perform only amplitude predistortion of an input signal prior to a modulator, and wherein the amplitude predistortion of the input signal is based on the analog control signal.

13. The portable communication device of claim 12 further comprising at least one digital to analog converter (DAC) providing the input signal to the amplifier and wherein the analog control signal is input as a reference voltage to the at least one DAC.

14. The portable communication device of claim 12 further comprising a variable gain amplifier providing the input signal to the amplifier, and wherein the analog control signal is input into the variable gain amplifier to adjust the magnitude of the input signal.

15. The portable communication device of claim 12 wherein the analog control signal is as a gate bias of the amplifier to adjust the amplitude of the input signal.

* * * * *